United States Patent Office 3,548,198
Patented Dec. 15, 1970

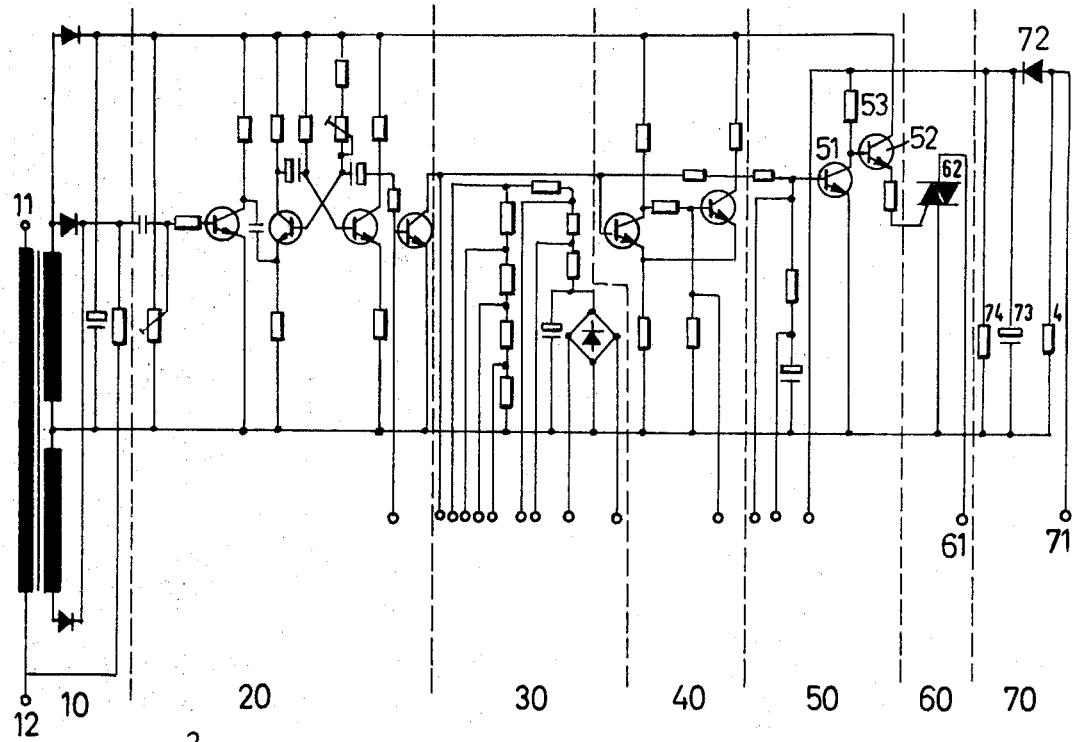
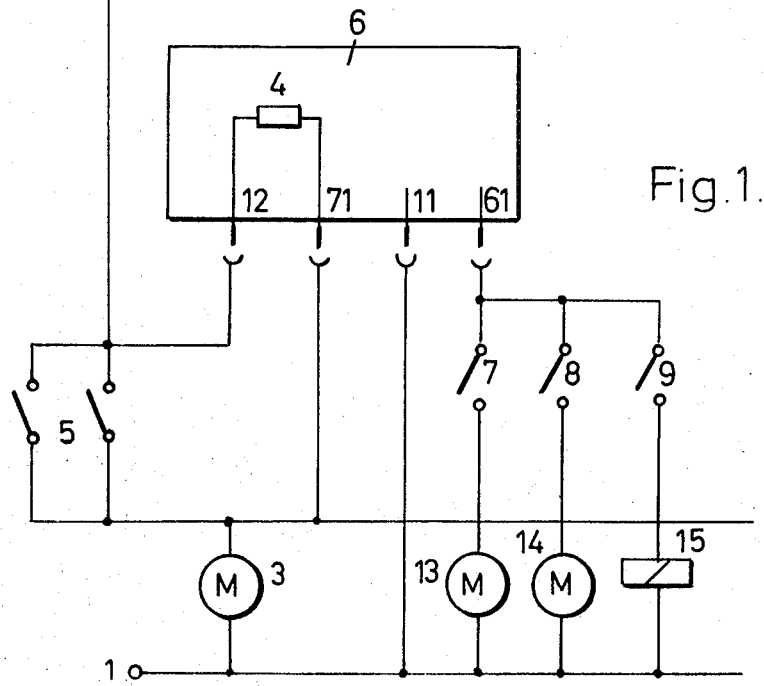
Fig. 2.
Fig. 1.

3,548,198
CIRCUIT FOR PREVENTING TRANSIENT OPERATION OF SEQUENCE-SWITCHED LOADS
Walter Holzer, Meersburg Bodensee, Germany, assignor to Holzer Patent AG, Zug, Switzerland
Filed July 11, 1968, Ser. No. 744,049
Claims priority, application Germany, July 12, 1967, 1,588,289
Int. Cl. H02j 3/14
U.S. Cl. 307—41         7 Claims

ABSTRACT OF THE DISCLOSURE

This disclosure teaches a circuit layout for preventing the switching-on of sequence-switched current-consuming units. A timing motor is controlled by sequence contacts for operating program contacts, each program contact being connected in series with one current-consuming unit and with an electronic regulator having a switching component for gating the supply current to the program contacts.

BACKGROUND

The object of this invention is to ensure that electrical loads which receive drive current from an electronic regulator are switched off when a programmer carries out several individual steps in immediate succession so that the loads are not subject to transient signals. When, however, during a normal program, the consuming units are operated in sequence at various intervals, it is intended that the electronic regulator shall act continuously to permit the supply of current to the load which is switched on by a particular program contact. Such an arrangement has special advantages for a program-controlled washing machine. If for example, the normal washing process should be interfered with by over running of the program, a door-release magnet can remain locked, so that the opening of the door when the washing drum is full is automatically prevented.

It is another object of the invention to provide such a circuit layout which is of simple construction and, therefore, inexpensive to produce, by which sequence-controlled current-consuming units can be reliably blocked or switched off when individual steps occur in immediate succession.

SUMMARY

According to the present invention the circuit includes a timing motor controlled by sequence contacts, and connected to operate program contacts. Each of the program contacts is connected, respectively, in series with a current-consuming unit, as well as with a single electronic regulator having a switching component. The switching component which is actuated to regulate current to the load, is also controlled to prevent the flow of current to the load when one of sequence switches is stepped through its positions in rapid succession. The switching component is energized by a timing unit having a time constant which is greater than the duration of one individual step.

A typical delay period is 1 second, for a step that takes about 0.7 second. By the acting of such limits, one has an assurance that the switching component will not be blocked when the individual steps occur in normal program timed sequence, but that it will be blocked if the program should be overrun so that the steps follow one another in immediate succession.

In this arrangement, the switching component in the electronic regulator is turned to good advantage, so that no additional mechanical blocking contact is required. The switching component thus fulfills a double purpose in that it not only regulates the consuming units connected, as is its primary function, but prevents these units from being energized if several individual steps should occur in immediate succession. If, as is the case in one recommended form of the invention, an electronic switching component such as a thyristor is used for example, the arrangement is particularly reliable in action, without the wear and maintenance entailed by extra contacts.

The layout, which has few components and is therefore particularly simple, is so designed that the timing unit that supplies the current for operating the switching component consists of a resistor and capacitor in parallel, the timing unit being connected, by way of a diode, in parallel with a series resistor serving the timing motor and bridging the sequence contacts.

A feature of another advantageous form of the circuit layout here proposed, with a two-stage amplifier with directly coupled transistors for operating a thyristor used as the switching component in the regulator, is that a resistor on the collector side of the transistor in the first amplifier stage is connected to the timing unit. In this way, the amplifying effect of the two-stage amplifier is also taken advantage of, so that the timing unit needs only to supply a small amount of energy for blocking the switching component. This means that a comparatively cheap capacitor of fairly low capacity, along with a low-output diode to charge it, will suffice.

DRAWING

An example of the circuit layout here proposed will now be described in detail with reference to the accompanying drawing, in which corresponding parts are similarly numbered.

FIG. 1 is a block diagram of a circuit embodying the invention.

FIG. 2 is a schematic diagram showing the details of the electronic regulator shown in FIG. 1.

PREFERRED EMBODIMENT

In FIG. 1 the terminals for connection to the supply mains are numbered 1 and 2. From terminal 2, there is a connection via two sequence contacts 5 and a timing motor 3 to terminal 1. A series resistor 4, for timing motor 3, is incorporated in an electronic regulator and connected across terminals 12 and 71 in parallel with sequence contacts 5. A line from terminal 1 is also connected to terminal 11 of an electronic regulator 6 and to washing motor 13, spinning motor 14 and a door releasing magnet 15. The other side of these current consuming units 13 to 15 is connected by way of program contacts 7, 8 and 9 respectively, to terminal 61 of the electronic regulator. The program contacts may lie, for example, on a control drum (not shown) coupled to timing motor 3. Sequence contacts 5 may consist of hand-operated switches, contacts controlled by some physical magnitude or time-controlled contacts.

The electronic regulator, shown in detail in FIG. 2, consists of main section 10, an astable multivibrator followed by amplifier 20, a rectifier with voltage divider for the regulating magnitude 30, two-stage time-base amplifier 50, thyristor 62, by way of switching stage 60, and a rectifier with timing unit 70. Except for mains section 10 and rectifier and timing unit 70, the order in which these functional sections have been enumerated also corresponds to the sense in which they operate. The various units 10, 20, 30 and 40, form a generator for producing a drive signal at the output of the thyristor 62.

In the context of the present invention, special interest attaches to rectifier and timing unit 70 and its connection to two-stage amplifier 50 and to the terminals appropriate to the connection of the rest of the circuit layout shown in FIG. 1. From FIG. 2, it can be seen that, in line with FIG. 1, a connection runs from terminal 12, via the series resistor 4 in timing unit 70, to terminal 71, while terminals 11 and 12 serve to connect mains section 10 to the current supply. Within timing unit 70, capacitor 73 and resistor 74 are joined in parallel to series resistor 4 via diode 72. Timing unit 70 supplies current to transistor 51 in two-stage amplifier 50, through resistor 53 on the collector side of the transistor. Transistor 51 is connected through a control transistor 52, followed by a resistor, to a control electrode of switching-stage thyristor 62. A wire from the thyristor runs to terminal 61, to which current consuming units 13 to 15 are connected through their program contacts 7 to 9.

The mode of operation of the circuit layout described is as follows:

The electronic regulator, in the first place, acts as determined by some control magnitude on any consuming unit connected to terminal 61 by the closing of its program contact. Since the circuit arrangement here proposed for barring the switching-on of sequence-switched consuming units is largely independent of the function of the electronic regulator, because the latter has only a switching component, in particular with a two-stage preamplifier, the action of this regulator need only be explained in principle. The electronic regulator is fed with direct current by mains section 10. The astable multi-vibrator with following amplifier gives a predetermined time ratio, which forms a constant for regulation. The multivibrator is coupled to time-base amplifier 40. This amplifier is also connected, through one of the (unnumbered) terminals shown, to the rectifier and voltage divider, the control magnitude being applied to the terminals joined directly to the rectifier. Now, two-stage amplifier 50 connected to time-base amplifier 40 controls thyristor 62 of switching stage 60, so that the consuming unit connected to terminal 61 is set by current pulses to the desired value of the control magnitude.

The arrangement for barring switching-on of the sequence-switched current-consuming units controlled by program contacts 7 to 9 also performs the following functions. While sequence contacts 5 are open, an alternating current voltage arises at series resistor 4 and is rectified by diode 72 and smoothed by capacitor 73 of the timing unit. This direct-current voltage passes via collector-side resistor 53 to transistor 51 in two-stage amplifier 50. Through transistor 52, thyristor 62 is opened and closed with a constant time base, according to the pulses on the base connection of transistor 51.

The closing of one of the sequence contacts 5 now initiates one individual step in the normal programme sequence. During this individual step, which may take for example, 0.7 sec., the voltage on series resistor 4 collapses. Nevertheless, transistor 51 continues to be supplied with direct current by capacitor 73, since, because of the ratings of capacitor 73 and resistor 74, this D.C. voltage collapses only after a delay of 1 second. Before the D.C. voltage can drop that far, however, the step lasting 0.7 second is completed and the capacitor is at once recharged to the full D.C. voltage through diode 72. The same sequence of events occurs when the next individual step takes place after an adequate time interval. In consequence of this, switching stage 60 is affected only by the electronic regulator during normal program control.

However, should series resistor 4 be short circuited for longer than 1 second by one of the sequence contacts 5, to overrun the program by a direct succession of individual steps, the D.C. voltage on capacitor 73 collapses in accordance with the time constant of timing unit 70. Transistor 52, connected directly to collector-side resistor 53 of transistor 51, will thus not conduct, so that thyristor 62 will close, irrespective of the signal on the base connection of transistor 51. Hence, any of the consuming units 13 to 15, of which program contacts 7 to 9 are closed in immediate succession, will remain unenergized. On completion of this succession of individual steps, the capacitor 73 will at once recharge, so that the consuming units now switched on will receive current pulses from the electronic regulator.

What is claimed is:

1. An electronic regulator for controlling the energization of a plurality of loads, said loads being connected respectively in series wtih a source of power and with a corresponding plurality of pairs of program switched contacts operated by a timing motor, said timing motor being connected to a plurality of sequence switched contacts for actuating said timing motor, wherein said regulator comprises
    an electronic switching element having two principal conducting electrodes and a control electrode, one of said conducting electrodes being connected to one contact of each pair of program switched contacts, and the other said conducting electrode being connected to said source of power;
    control means coupled to said control electrode for operating said switching element between conductive and non-conductive states; and
    timing means coupled between said sequence switched contacts and said control means for timing the speed of switching of said sequence switched contacts, said control means being responsive to said timing means to switch said switching element to a non-conductive state when said sequence switches are operated above a predetermined speed.

2. The invention as set forth in claim 1 in which said control means comprises
    a semiconductor element having first and second current conducting electrodes and a base electrode,
    said first current conducting electrode being connected to said source of power,
    said second current conducting electrode being coupled to said control electrode of said electronic switching element,
    and said base electrode being coupled to said timing means for receiving a bias voltage from said timing means,
    said bias voltage being dependent upon the speed of operation of said sequence switches and thereby controlling conduction of said electronic switching element.

3. The invention as set forth in claim 2, further comprising
    generator means coupled to said base electrode of said semiconductor element for providing a drive signal for said loads,
    said drive signal being coupled to said loads through said semiconductor element and said electronic switching element when said electronic switching element is operated in a conductive state.

4. The invention as set forth in claim 3 in which said timing means comprises
    a rectifying diode and a resistor-capacitor time constant circuit,
    said resistor being coupled to said capacitor,
    and said capacitor being connected between said source of power and one side of said diode,
    the other side of said diode being connected to said sequence switches for allowing said resistor-capacitor time constant circuit to charge and discharge in response to the switching of said sequence contacts, thereby controlling the bias voltage on said semiconductor element.

5. The invention as set forth in claim 1 in which said timing means comprises
    a rectifying diode and a resistor-capacitor time constant circuit,
    said resistor being coupled to said capacitor,
    and said capacitor being connected between said source of power and one side of said diode,
    the other side of said diode being connected to said sequence switches for allowing said resistor-capacitor time constant circuit to charge and discharge in response to the switching of said sequence contacts, thereby providing a control voltage to said switching element between conductive and non-conductive states.

6. The invention as set forth in claim 5 in which said control means comprises a semiconductor element having first and second current conducting electrodes and a base electrode, said first current conducting electrode being connected to said source of power, said second current conducting electrode being coupled to said control electrode of said electronic switching element, and said base electrode being coupled to said one side of the diode in said timing means for receiving a bias voltage from said timing means, said bias voltage being dependent upon the speed of operation of said sequence switches and thereby controlling conduction of said electronic switching element.

7. An electronic regulator for controlling the energization of a plurality of loads, said loads being connected respectively in series with a source of power and with a corresponding plurality of pairs of program switched contacts operated by a timing motor, said timing motor being connected to a plurality of sequence switched contacts for actuating said timing motor, wherein said regulator comprises an electronic switching element having two principal conducting electrodes and a controle electrode, one of said conducting electrodes being connected to one contact of each pair of program switched contacts, and the other said conducting electrode being connected to said source of power;

timing means coupled between said sequence switched contacts and said control electrode for timing the speed of switching of said sequence switched contacts, said control electrode being responsive to a signal coupled from said timing means to switch said switching element to a non-conductive state when said sequence switches are operated above a predetermined speed.

References Cited

UNITED STATES PATENTS 3,200,303   8/1965   Maxwell   307—41
3,259,765   7/1966   Fernholt   307—141.4

ROBERT K. SCHAEFER, Primary Examiner

H. J. HOHAUSER, Assistant Examiner